Figure 1:
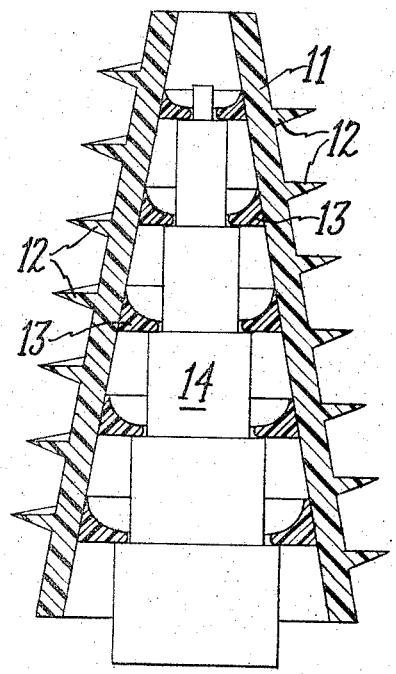

Aug. 29, 1967     M. KUHL     3,338,768
METHODS FOR ACHIEVING SUFFICIENT CREEPAGE CURRENT STRENGTH
IN THE INTERIOR OF HOLLOW PLASTIC INSULATORS
Filed Nov. 10, 1964

Inventor,
Martin Kuhl,
by Gilbert P. Tarleton
His Attorney.

United States Patent Office 3,338,768
Patented Aug. 29, 1967

3,338,768
METHODS FOR ACHIEVING SUFFICIENT CREEPAGE CURRENT STRENGTH IN THE INTERIOR OF HOLLOW PLASTIC INSULATORS
Martin Kuhl, Berlin, Germany, assignor to Allgemeine Elektricitats-Gesellschaft m.b.H.
Filed Nov. 10, 1964, Ser. No. 410,131
11 Claims. (Cl. 156—293)

This invention relates to electrical insulators and more particularly to a method of increasing the internal creepage strength of hollow conical insulators.

A prior invention concerns a method of making plastic insulators equipped with skirts, the plastic shell of which is preferably of a wound-type construction. According to this method plastic tapes are wound spirally onto the plastic shell and anchored in this position, for example by adhesive or fusion action. The plastic bands have suitable cross sectional shapes to assure adequately long creepage paths on the outer surface of the insulator. By this means the outer surface problems of such insulators are solved. When dealing with insulators for very large transverse forces, so-called hollow support insulators or hollow traverses must be used in order to offer the required moment of resistance. But in this case also means must be found to increase the electrical creepage path inside the hollow unit.

It is the purpose of the present invention to provide a method for applying such insulating skirts to the interior of hollow shells which are made of a laminated winding. In the production of plastic insulators made from cast resin and cured without applied pressure, a known method had permitted the casting of hollow insulators with many undercuts. In that method, a thermoplastic body is used as an inner core with a negative contour in regard to the desired inner surface of the resinous insulator. The material of the inner core must be chosen so that it will just withstand the casting temperature when the resin body is cast. After cooling and curing of the resin material, which now has a much higher temperature of decomposition, the thermoplastic inner core is then removed by melting it out after removal of the outer metallic mold. However, in the present case the insulator is to be made by the winding of resin laminates with glassfiber reinforcement to produce high mechanical strength.

Casting of the body shell is therefore not feasible. Of course it would be possible to cast into it the interior insulating skirts and follow the melt-out procedure as delineated above. But this additional manufacturing step would cause an undue rise in the price of the resin insulator.

Accordingly, an object of the invention is to provide novel methods of providing a hollow plastic insulator made by a winding process with interior skirts.

The invention will be better understood from the following description taken in connection with the accompanying drawing and its scope will be pointed out in the appended claims.

Figure 2:
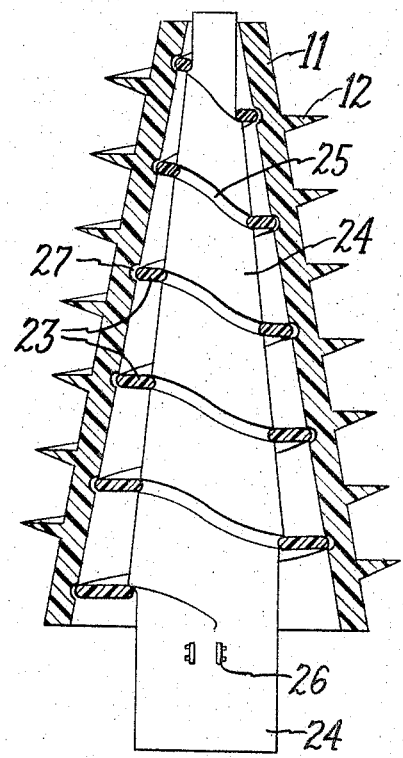

In the drawing,

FIGS. 1 and 2 show two ways of attaching skirts in hollow insulator supports or traverses made of plastics.

In FIG. 1 the tubular resin shell made by a winding process is marked 11 and the exterior skirts 12—spirally wound on—are attached already. The inner skirts 13 have sequentialy larger diameters stemming from the tapered shape of shell 11, and they consist preferably of the same basic material as 11, i.e. a duroplastic or thermoplastic resin; but they could be made from ceramics or glass if a suitable binder is chosen.

In the assembly of inner skirts 13 all common adhesive surfaces at the inner shell and the skirts are first brushed with a binder. If skirts and shell use the same material, the binder may also have it. The wet skirts are inserted one after the other into the shell whereby the skirts are spaced resulting from the tapered shape of the shell. Thereafter a pressure plug 14 is pushed into the assembly, its diameter decreasing in steps to match the skirts. Perfect adhesion is accomplished by pressing the step-like plug against the skirts in the direction of the arrow.

In order to utilize the advantages of a spiral-shaped skirt also inside the shell 11, FIG. 2 presents a procedure where again outer skirts 12 are present already. Upon a pressure plug 24 there is wound up a band 23 of thermoplastic resin into a spiral groove 25 provided for that purpose. This groove must have a constant pitch. Both ends of the resin band, which easily gets flexible from heating due to the thermoplastic structure, may be fixed to the pressure plug 24 by a clamp 26 so that it cannot slide along groove 25.

Now plug 24 with its plastic band 23 is run into the interior of shell 11 which also is provided with a groove 27 of same profile and pitch. The travel of plug 24 is terminated by the tapering of the shell; at this point the spiraled band 23 and groove 27 are facing each other. For the time being a gap remains between them into which a low-viscosity binder fluid is poured from the end near the mouth of shell 11. Preferably one chooses a uniform material like a methacrylate resin, which can be cast, for band 23 and shell 11 which also has good characteristics in regard to corona and weathering. Then the binding fluid could be of the same material with its viscosity easily adjusted by a thinner. When the rig is set up horizontally the binder may be distributed between band 23 and groove 27 by rotating the entire fixture. When assembling vertically, the fluid will run along the gap by itself until it emerges at the other end. This assures complete wetting of all the areas of adherence.

Now shell 11 is held rigidly so that it resists the rotation of pressure plug as described below. The plug is turned about its axis by a small angle in the direction of the pitch of band 23. Clamps 26 must be released before this, to free the ends of band 23. Screwing of plug 24 into shell 11 causes the resin band to be forced into groove 27 in shell 11, while the band slides in groove 25 of the plug. This groove should have a lubricant, i.e. a silicone grease to encourage relative motion.

One may circulate hot air through the remaining spiral gaps between band and grooves to accelerate the adhesive process. The fluid solidifies quicker because the thinner can escape more rapidly. Also, the thermoplastic band 23 turns flexible easily, which allows more readily a change in diameter of each turn during the pressure rotation of plug 24. After the binding fluid has solidified plug 24 is loosened easily with a rotary motion from the plastic band which now adheres well to the shell 11. After one-quarter or one-half turn, depending on the pitch, it may be pulled out of the shell.

An improvement of the mechanical and electrical strength of the inner as well as outer skirts is obtained with additional fusion of the skirts to the shell, especially when using a thermoplastic coating resin.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. A method for achieving sufficient creepage current strength in the interior of hollow conical support insulators made of plastic characterized in that insulating skirts are inserted in the interior insulator space by means of a pressure plug and by pressing them against the inner wall using an adhesive binder.

2. A method as in claim 1 in which the skirts are in the shape of rings.

3. A method as in claim 1 in which the skirts are in the shape of a spiral resin band.

4. A method as in claim 1 distinguished in that the insulator shell, skirts and binder are made of the same material.

5. A method for achieving sufficient creepage current strength in the interior of hollow conical support insulators made of plastic characterized in that insulating skirts in the shape of a spiral resin band are inserted in the interior insulator space by means of a pressure plug and by pressing them against the inner wall using and adhesive binder, said method being further characterized in that said plastic band is wound spirally in a constant pitch groove on said plug and fastened to the plug, that the inner wall of the shell is provided with a groove of the same pitch and profile as the band and that after running the pressure plug with its plastic band into the shell the band is pressed into the receiving groove by turning the pressure plug.

6. A method as in claim 5 characterized in that warm air is circulated through the spiral-shaped voids during movement of the pressure plug.

7. A method as in claim 1 characterized in that the skirts are also fused with shell (11) after removal of the pressure plug (14, 24).

8. A method as in claim 1 distinguished in that the skirts consist of ceramics.

9. A method as in claim 4 in which said material is a thermoplastic casting resin.

10. A method as in claim 9 in which said thermoplastic casting resin is a methacrylate.

11. A method as in claim 1 distinguished in that the skirts consist of glass.

References Cited

UNITED STATES PATENTS

| | | | |
|---|---|---|---|
| 1,164,739 | 12/1915 | Mershon | 156—293 X |
| 1,440,003 | 12/1922 | Bultemann | 156—293 |
| 1,555,940 | 10/1925 | Bultemann | 156—293 X |
| 1,558,498 | 10/1925 | Peck et al. | 156—293 |
| 1,742,625 | 1/1930 | Weckerle | 156—293 |

EARL M. BERGERT, *Primary Examiner.*

HAROLD ANSHER, *Examiner.*